United States Patent
Miyabe et al.

(10) Patent No.: US 7,967,598 B2
(45) Date of Patent: Jun. 28, 2011

(54) MOLDING DIE AND METHOD FOR MOLDING A MOLDED ARTICLE

(75) Inventors: Yoshihisa Miyabe, Nisshin (JP);
Kazuhiro Doteguchi, Toyota (JP);
Katsuyoshi Shimakata, Toyota (JP);
Shu Onodera, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 348 days.

(21) Appl. No.: 12/161,144

(22) PCT Filed: Jan. 17, 2007

(86) PCT No.: PCT/JP2007/051028
§ 371 (c)(1),
(2), (4) Date: Jul. 16, 2008

(87) PCT Pub. No.: WO2007/083825
PCT Pub. Date: Jul. 26, 2007

(65) Prior Publication Data
US 2010/0155981 A1    Jun. 24, 2010

(30) Foreign Application Priority Data
Jan. 17, 2006    (JP) .................... 2006-008175

(51) Int. Cl.
*B29C 44/58* (2006.01)
*B29C 44/12* (2006.01)
(52) U.S. Cl. ....... 425/415; 425/414; 425/418; 264/45.2; 249/82
(58) Field of Classification Search .......... 264/45.2; 425/414, 415, 418; 249/159, 82
See application file for complete search history.

(56) References Cited

U.S. PATENT DOCUMENTS

| 5,702,810 A | * | 12/1997 | Koseki et al. ............ 428/318.8 |
| 6,099,949 A | | 8/2000 | Nomura et al. |
| 7,060,215 B2 | * | 6/2006 | Schoemann et al. .......... 264/245 |
| 2004/0017023 A1 | * | 1/2004 | Schoemann et al. .......... 264/245 |

FOREIGN PATENT DOCUMENTS

| JP | 5-237871 | 9/1993 |
| JP | 7-88878 | 4/1995 |
| JP | 7-214630 | 8/1995 |
| JP | 8-85132 | 4/1996 |
| JP | 11-10673 | 1/1999 |
| JP | 2002-178364 | 6/2002 |
| JP | 2003-145582 | 5/2003 |
| JP | 2006-232187 | 9/2006 |

\* cited by examiner

*Primary Examiner* — Yogendra N Gupta
*Assistant Examiner* — Alison Hindenlang
(74) *Attorney, Agent, or Firm* — Finnegan, Henderson, Farabow, Garrett & Dunner, LLP

(57) ABSTRACT

A molding die and a method for molding a molded article including a foam layer made up of faces extended in a plurality of directions are provided, by which all of the faces can grow up to a predetermined expansion ratio or more. To this end, a molding die 1 includes a stationary die including a main die 2 and a slide die 3 movable relative to the main die 2, and a movable die 4. The slide die 3 partially faces a cavity C and can move in a direction (Y direction) different from a die clamping/die opening direction (X direction). When a foam layer a2 made up of a face a21 orthogonal to the die clamping/die opening direction and a face a22 other than the face a21 grows in the cavity C, at least the slide die 3 moves in Y direction, whereby both of the faces a21 and a22 of the foam layer a2 can grow to satisfy a predetermined expansion ratio.

6 Claims, 11 Drawing Sheets

(a)

(b)

(c)

(d)

(e)

(a)

(b)

(c)

(d)

MOLDING DIE AND METHOD FOR MOLDING A MOLDED ARTICLE

CROSS REFERENCE TO RELATED APPLICATION

This application is a national phase application based on PCT/JP2007/051028, filed on Jan. 17, 2007, the content of which is incorporated herein by reference, which claims the priority of Japanese Patent Application No. 2006-008175, filed on Jan. 17, 2006, the content of which is incorporated herein by reference.

TECHNICAL FIELD

The present invention relates to a molding die made up of a stationary die and a movable die for molding a molded article with a two-layer structure of a core and a foam layer within a cavity defined between the two dies and relates to a method for molding a molded article using the molding die, and more particularly relates to a molding die and a method for molding a molded article which are capable of molding a foam layer including faces extended in a plurality of directions so that each face has desired softness by allowing each face to grow up to a predetermined expansion ratio or more.

BACKGROUND ART

Interior equipment of an automobile, such as an instrument panel, has a two-layer structure including a core and a foam layer made of a resin material such as polyurethane or polypropylene, and in general such interior equipment is manufactured in a die by injection molding.

A resin material in a molten state at a high temperature/a high pressure is charged into a cavity of the die made up of a stationary die and movable die, and then the movable die, for example, is opened to reduce a pressure in the cavity, thus foaming $CO_2$ gas dissolved in the resin material to be in the form of bubbles. The amount and the speed of opening this movable die are adjusted appropriately so as to grow bubbles in an appropriate size, resulting in a foam layer (soft layer) with desired softness. Therefore, the thickness of the foam layer is determined by the expansion rate of the foam layer, and if this expansion rate or the thickness satisfies a predetermined value, then the foam layer will have predetermined softness.

Meanwhile, since interior equipment such as an instrument panel has a relatively complex shape and has a plurality of apertures, injection molding is conducted in the cavity defined by the stationary die and the movable die, followed by the movement of the movable die, for example, in a die clamping/die opening direction as a certain direction, so as to release the die from a molded article. That is, since opposing faces (or contacting faces) of both of the dies have a complex shape, their die clamping/die opening direction is limited to a certain direction, and even if the movable die is moved to other directions, such movement of the movable die will be inhibited because the die interferes with the molded article.

In the case where the foam layer is extended in a direction orthogonal to the die clamping/die opening direction, the movable die can move freely in accordance with the growth of the foam layer, so that the foam layer can grow up to an appropriate expansion ratio. On the other hand, if the foam layer has a shape including a face extended in another direction in addition to such a face extended in the direction orthogonal to the die clamping/die opening direction, the expansion ratio of the foam layer at the face extended in the other direction is not the same as the expansion ratio of the foam layer in the direction orthogonal to the die clamping/die opening direction, and therefore there is a high possibility that desired softness is not satisfied. Conventionally, allowing for such a problem, the foam layer extended in a direction different from the direction orthogonal to the die clamping/die opening direction is molded to be relatively hard. For instance, referring to FIG. 16 showing a conventional molding die, a molded article a made up of a core a1 having an aperture a11 and a foam layer a2 formed on a part of a surface of the core is molded in a cavity between a movable die b1 and a stationary die b2. Herein, the die clamping/die opening direction of the movable die b1 is X direction. The foam layer a2 is made up of a face a21 in the direction orthogonal to the die clamping/die opening direction and a face a22 rising obliquely from the face a21. When the foam layer a2 grows for foaming, the movable die b1 moves in X direction, and such movement enables the foam growth of the face a21 of the foam layer up to a predetermined expansion ratio in a foam growth direction Y1. On the contrary, since a cavity space corresponding to the foam growth of the face a22 of the foam layer cannot be secured, the foam growth in a foam growth direction Y2 is inhibited. As a result, the foam layer as a whole will be made up of a portion that grows up to a predetermined expansion ratio to have sufficient softness and a portion without sufficient softness because the portion cannot grow up to the predetermined expansion ratio.

Patent Document 1 discloses the invention relating to a die system capable of molding an article made up of a portion including a skin layer and a base layer and a portion including only a base layer using one die system. According to this die system, in a cavity defined by a core die (stationary die) and a cavity die (movable die), the base layer is firstly injection-molded. After the base layer is cured, a skin layer can be injection-molded on a predetermined surface of the base layer. Conventionally, after a base layer is molded using a different die system, the base layer is placed in a cavity of a die system for molding a skin layer and a skin layer is molded, and therefore there are problems that the manufacturing process of the molded article is long and the manufacturing is inefficient. The invention of Patent Document 1 is for solving such problems. Incidentally, the skin layer referred to in this invention corresponds to the above-described foam layer.

Patent Document 1: JP Patent Publication (Kokai) No. 08-85132 A (1996)

DISCLOSURE OF THE INVENTION

According to the die system disclosed in Patent Document 1, a molded article with a two-layer structure including a base layer and a skin layer can be manufactured effectively using one die system. However, the foam growth of the skin layer in a movable direction of the cavity die (movable die), i.e., in a direction orthogonal to a die closing/die opening direction of the cavity die is relatively significantly different from the foam growth of the skin layer in other directions, resulting in a failure to solve the problem of a portion of the skin layer with desired softness and a portion without such softness existing in parallel. Therefore, even with the use of such a die system, a molded article made up of multiple faces of the skin layer each having desired softness cannot be manufactured.

In view of the above-stated problems, it is an object of the present invention to provide a molding die and a method for molding a molded article with a foam layer including faces extended in a plurality of directions, which are capable of molding the foam layer so that each face of the foam layer has desired softness by allowing each face to grow up to a predetermined expansion ratio or more.

In order to fulfill the above-stated object, a molding die according to the present invention includes a stationary die and a movable die, the molding die being for molding a molded article in a cavity defined between both of the dies, the molded article having a two-layer structure of a core and a foam layer. The stationary die includes a main die and a slide die that moves relative to the main die, the slide die partially faces the cavity and moves in a direction different from a die clamping and die opening direction, and a face of the slide die that faces the cavity includes faces extended in a plurality of directions that are not mutually in parallel.

The molding die of the present invention relates to a die capable of molding an article having a two-layer structure of a core and a foam layer so as to allow both of the core and the foam layer to be molded within the cavity defined between the stationary die and the movable die. The core may be molded by press-molding a plate member made of resin or steel in a cavity as well as by injection-molding. At a predetermined region of the surface of the core molded in a predetermined shape, the foam layer is injection-molded. This foam layer is molded using appropriate resin, for example, made of the already-described polyurethane or polypropylene.

As the foam layer grows for foaming, the movable die or the stationary die moves in the die clamping/die opening direction. That is, the movable die may move relative to the stationary die that does not move, or the stationary die may move relative to the movable die that does not move. For instance, the movable die may move relative to the stationary die in a so-called die clamping/die opening direction, and in the case where the stationary die is aligned and fixed below the movable die, the moving direction of the movable die perpendicularly upward will be the die clamping/die opening direction. Although the cavity has any shape depending on the shape of an article to be molded within the cavity, in the present invention, at least a portion of the cavity for molding the foam layer is made up of faces having a plurality of angles, and the slide die may be attached movably to the stationary die so as to correspond to the faces of the plurality of angles. The slide die is provided on one side (cavity side) of the main die constituting the stationary die.

Herein, the slide die is attached to the main die of the stationary die so that it can move in at least a direction different from the die clamping/die opening direction. This direction is set to allow all of the faces of the foam layer having the plurality of angles to grow at the same level of expansion ratio. As all of the faces grow for foaming, the slide die moves in an appropriate direction, whereby the all of the faces can grow for foaming at the same level. Since a conventional die system is not provided with such a slide die, when such a foam layer made of two faces grows, the foam growth of a face orthogonal to the die clamping/die opening direction is desirably achieved by the movement of the movable die or the stationary die in the die clamping/die opening direction, whereas the foam growth of a face in another direction is significantly small. Therefore, such a face cannot realize sufficient softness.

Herein, the predetermined expansion ratio will vary depending on the softness required for the molded article, and therefore the expansion ratio can be set as appropriate. For instance, the expansion ratio can be set at about 1.8 to 2 times the original thickness when a material is initially charged into the cavity.

According to the molding die of the present invention, in accordance with the foam growth of the foam layer having faces extended in a plurality of directions, the movable die or the stationary die moves in the die clamping/die opening direction, and at that time the slide die in direct contact with the foam layer can slide in a movement direction allowing all of the faces making up the foam layer to satisfy the same level of or a predetermined expansion ratio, and therefore the foam layer can grow so as to have desired softness without inhibiting the movement of the movable die or the stationary die.

In another embodiment of the molding die of the present invention, the face of the slide die that faces the cavity includes a face orthogonal to the die clamping and die opening direction and another face.

In the molding die of the present invention, the cavity face of the slide die is made up of a face orthogonal to the die clamping and die opening direction and another face, and the other face is made up of a flat face or a curved face.

For instance, in the case where they are the face orthogonal to the die clamping and die opening direction and a face substantially in parallel with the die clamping and die opening direction, the movement direction of the slide die is set at an angle direction of ½ of the central angle formed by these two faces or at an angle close thereto, whereby as both of the faces of the foam layer grow for foaming, the slide die can move in such an angle direction, so that the both faces can grow for foaming at a same level.

In still another embodiment of the molding die of the present invention, the main die includes an accommodation space that accommodates the slide die partially or all of the slide die, the slide die includes a shaft member that guides the slide die to move in a predetermined direction, the movable die includes a guide groove in which the shaft member is loosely fitted, the movable die is provided at a position opposed to the main die and the slide die with the shaft member being loosely fitted in the guide groove, and as the movable die or the stationary die and the slide die move in accordance with growth of the foam layer, each of faces extended in a plurality of directions making up the foam layer is molded up to a predetermined expansion ratio.

In the main die of the stationary die, a side facing the cavity is provided with the accommodation space that accommodates the slide die partially or all of the slide die, and the slide die is loosely fitted in this accommodation space. Herein, in order to guide the slide die to move in a predetermined direction, the slide die is provided with a shaft member at an end thereof, the movable die includes a guide groove bored therein in which this shaft member can be loosely fitted, the guide groove being extended in a direction of the slide die movement direction, and the slide die and the movable die are attached to the main die so that the shaft member is loosely fitted in the guide groove, whereby the molding die can be configured.

According to the configuration of the molding die of the present invention, when the foam layer grows for foaming in the cavity, the slide die can slide in a desired direction, i.e., in a direction allowing all of the faces of the foam layer to grow so as to satisfy a predetermined expansion ratio. Further, the movable die or the stationary die also is allowed to move freely in the die clamping/die opening direction in accordance with the foam growth of the foam layer.

Herein, a cam plate with a groove, for example, may be attached to a side face of the movable die so as to prevent the movable die or the stationary die from displacing in the horizontal direction when the movable die or the stationary die moves in the die clamping/die opening direction that is a vertical direction, for example. The cam plate is provided with a groove extended in a predetermined direction, so that the stationary die and the slide die, and the movable die are assembled so that the shaft member attached to the slide die is loosely fitted in the groove, whereby the movement of the movable die or the stationary die in a predetermined die clamping/die opening direction can be secured in addition to the movement of the slide die relative to the stationary die in a predetermined direction.

Since the molding die of the present invention has a simple configuration, it can be manufactured at a relatively low cost. Thus, using a molding die at a low cost of the present invention, it is possible to mold a molded article in which all of the faces of the foam layer including a plurality of angle faces can satisfy a desired expansion ratio.

In a further embodiment of the molding die of the present invention, the main die includes an accommodation space that accommodates the slide die partially or all of the slide die, the accommodation space is molded so as to allow the slide die to move in a predetermined direction, and the slide die is moved by an actuator so as to form a cavity for the foam layer in accordance with growth of the foam layer.

This embodiment of the present invention relates to a molding die in which the accommodation space of the main die that accommodates the slide die partially or all of the slide die is molded to be in a predetermined movement direction of the slide die, in this accommodation space, the slide die is accommodated movably, and the movement of this slide die is implemented by an appropriate actuator. The slide die movement direction length in this accommodation space has to be set at least at a total sum of the foam layer thickness after the growth and the length of the slide die.

For instance, a feed screw is provided below the accommodation space, where the feed screw can be rotated by a servo motor that is one example of the actuator. A nut may be mounted so as to be movable in a shaft direction of the feed screw in accordance with the rotation of this feed screw (screw shaft), so that the slide die mounted on the nut can move within the accommodation space in accordance with the movement of the nut. For instance, two nuts are provided so as to move in opposite directions of the shaft in accordance with the rotation of the screw shaft (move in the directions so that they are away from each other), where upper faces of the nuts are formed in an inclined shape, and leg members are mounted at a lower face of the slide die so as to be in contact with the two nuts, respectively. The face of each leg member that is brought into contact with the nut is formed in an inclined shape adapted to the inclination of the nut, whereby the screw shaft is rotated by the rotation of the servo motor, thus causing the two nuts to move along the shaft direction of the screw shaft so as to be away from each other, for example, so that in accordance with the movement of the two nuts, the slide die can move to fall downward (shaft axis direction) along the inclination of the nut upper faces. The downward movement of the slide die expands the cavity space for the foam layer, whereby the foam layer can grow for foaming within this cavity space. Herein, it is desirable that the rotation of the servo motor is adjusted so that the slide die can move in accordance with the growth of the foam layer. Note here that the molding die of the present invention is not limited to the above-described embodiments, and any combination of an appropriate actuator and movement means of the slide die by the actuator can be selected.

According to the present invention, there is no need to move the movable die relative to the stationary die when the foam layer grows for foaming, and each face of the foam layer having a plurality of angle faces can grow so as to satisfy a desired expansion ratio simply by the movement of the slide die in a predetermined direction within the accommodation space. Further, a servo motor is used as the actuator, for example, and a feed screw mechanism is applied as the movement means of the slide die, whereby the molding die can be manufactured at a significantly low cost.

In the molding die according to a still further embodiment of the present invention, a linear vector orthogonal to each of the faces extended in a plurality of directions making up the face of the slide die that faces the cavity is determined based on an area ratio of each face, a combined vector is determined by combining the respective linear vectors, a direction orthogonal to the combined vector is set as a movement direction of the slide die, one side face of the slide die is pushed out by an actuator, an inner wall of the movable die opposed to another side face of the slide die on the opposite side of the one side face is formed to be extended in a direction of the combined vector, and the slide die moves along the inner wall.

In the molding die of the present invention, allowing for the cavity face including faces extended in a plurality of directions (or the shape of the foam layer), a foam growth direction representative of the directions is determined beforehand, and a direction orthogonal to such a representative direction is set as the movement direction of the slide die, and among inner wall faces of the movable die, an inner wall face that guides the movement of the slide die while the slide die being in contact with the inner wall face is set to be extended in the direction of the combined vector.

When the representative direction of the foam growth direction is determined, a vector quantity of a linear vector in a direction orthogonal to each face is firstly determined based on an area of each face. These linear vectors are combined, whereby the foam growth direction representing the foam layer can be decided with consideration given to the area ratios of the respective faces. Note here that in the case where the foam layer includes a curved face, a direction normal to the center of the curved face can be made as the linear vector direction, and a projected area of the curved face can be assumed as the area of the curved face, whereby the vector quantity and the direction of the linear vector can be set.

In the case where the slide die is configured to move in a direction orthogonal to the above-stated combined vector, the maximum value of the pressure applied when the foam layer foams will act on the inner wall face of the stationary die that is in contact with the lower face of the slide die. That is, since the foam layer grows in a plurality of directions depending on the shape of the foam layer in practical, the pressure will act on in the respective growth directions. However, in the present invention, since the inner wall face of the stationary die supporting the slide die from below is formed in the direction orthogonal to the combined vector direction of the respective faces making up the foam layer, this face will receive the maximum pressure when the foam layer is molded.

Meanwhile, the slide die is configured to be moved by the actuator in the direction orthogonal to the above-stated combined vector direction. Therefore, since the stationary die receives the maximum pressure and the actuator operates in the direction orthogonal thereto, i.e., in the direction where the pressure acting when the foam layer grows for foaming is the minimum, the performance or the specifications of the actuator that are required for moving the slide die can be made the minimum. Incidentally, the applied actuator is not limited especially, and a servo motor or a hydraulic or pneumatic cylinder unit may be used, for example.

In accordance with the foam growth of the foam layer, the movable die or the stationary die moves in the die clamping/die opening direction. That is, the movable die may move relative to the stationary die that does not move, or the stationary die may move relative to the movable die that does not move. Meanwhile, one side face of the slide die is pushed out by an actuator in the direction orthogonal to the above-stated combined vector, and another side face of the slide die moves to be guided to the inclined direction of the inner wall face of the movable die. The direction of this inner wall face of the movable die is set in the direction of the above-described combined vector. Thus, in the case where the direction of the combined vector is inclined by θ with respect to the die clamping/die opening direction, when the movable die moves in the die clamping/die opening direction with respect to the movable die and the slide die is pushed out by the actuator, for example, the slide die can move in a predetermined θ direction so as to be guided by the inner wall face of the movable die.

According to the molding die of the present invention, the output performance of the actuator that pushes out the slide die can be made as small as possible. Further, since the slide die can move in accordance with the foam growth of the foam layer while being guided by the inner wall face of the movable die extended in the combined vector direction of the foam layer extended in a plurality directions, all of the faces making up the foam layer can grow so as to satisfy a predetermined expansion ratio.

In the molding die according to another embodiment of the present invention, a sensor is built in the movable die, the sensor being for confirming whether the slide die is in contact with the inner wall face of the movable die.

Since it is configured so that the slide die is pushed out by the actuator in accordance with the foam growth of the foam layer while being guided by the inner wall face of the movable die, it is significantly important to find out whether the slide die is in contact with the inner wall face of the movable die, in order to confirm that the slide die moves in a predetermined direction. This is because since the slide die moves in a predetermined direction as stated above, i.e., in the above-described combined vector direction, the foam growth of all of the faces of the foam layer extended in a plurality of directions can be promoted.

Then, in the molding die of the present invention, an appropriate sensor is built in the inner wall face of the movable die to which the slide die is to be in contact with for confirming whether the slide die is surely in contact with the inner wall face.

Herein, although the form of the sensor is not limited especially, a limit switch, a pressure sensor or a contact image sensor may be used, for example. In the case of a limit switch, it may be configured so that the limit switch turns ON at the time when the slide die is brought into contact with the inner wall face of the movable die, and in the case of a pressure sensor, any pressure threshold may be set so as to enable the confirmation of the secure contact of the slide die with the inner wall face of the movable die at the time when pressure of the threshold or higher is applied to the sensor. Note here that in the case of any form of sensor used, a plurality of sensors may be built in the inner wall face of the movable die in the movement direction of the slide die, whereby it can be found out at every stage of a certain amount of movement (foam growth amount) that the slide die moves while being in contact with the inner wall face of the movable die securely.

The molding die according to still another embodiment of the present invention further includes alarm means that informs that a result of detection by the sensor is beyond a predetermined threshold value.

The alarm means may be connected with the sensor, thus informing an operator by alarm, or alarm may be displayed on a screen of a computer with which the sensor is connected. If it is detected that the slide die is not in contact with the inner wall face of the movable die, the alarm means stops the operation of the movable die or the slide die, thus allowing an operator to confirm the situation, so that the manufacturing of defective molded articles can be stopped early.

In the molding die according to a further embodiment of the present invention, the movable die includes a main die and an insert that rotates inside the main die, one face of the insert faces the cavity, and the molding die further includes adjustment means that adjusts an angle of the one face of the insert every time the core or the foam layer is molded.

In the case where the core and the foam layer are provided with faces extended in a plurality of directions, an undercut portion is often formed between a die and a core or a molded article in which a foam layer is formed on a surface of a core when the die is opened after the core is molded or when the die is opened after the foam layer is molded.

The molding die of the present invention relates to a molding die enabling the undercut process during such die opening, and especially in the present invention the movable die is made up of a main die and an insert that rotates inside the main die, in which the undercut process is performed effectively by rotating the insert appropriately. Rotation adjustment of this insert is implemented by adjustment means in a computer connected with the molding die, and when the die is opened after the core is molded or when the die is opened after the foam layer is molded (after the molded article is molded), a predetermined rotation angle instruction signal is transmitted to the insert whereby the rotation of the insert can be implemented. Further, in this molding die, a stationary die for molding the core may be prepared separately from a stationary die for molding the foam layer, and when the die is opened after the core is molded, the undercut process is conducted while rotating the insert of the movable die, and when the foam layer is molded, the angle of the insert is adjusted appropriately and the movable die is placed to the stationary die for molding the foam layer, whereby the molding from the core to the foam layer can be conducted using one movable die.

In the molding die according to a still further embodiment of the present invention, the movable die includes a main die and an insert that moves inside the main die in a direction of the combined vector.

The molding die of the present invention allows the undercut process to be conducted by sliding the insert of the movable die in the above-stated combined vector direction instead of rotating the insert of the movable die.

Also according to the molding die of the present invention, when the core is molded and when the foam layer is molded, the sliding of the insert making up the movable die is adjusted, thus allowing an appropriate cavity space to be formed, whereby the molding from the core to the foam layer can be conducted using one movable die.

A method for molding a molded article according to the present invention is for molding a molded article with a two-layer structure of a core and a foam layer using a molding die including a stationary die including a main die and a slide die capable of moving relative to the main die, and a movable die, the molded article being molded in a cavity defined by the stationary die and the movable die, the foam layer including faces extended in a plurality of directions. The method includes the steps of: a first step of molding the core in the cavity to be a predetermined shape; and a second step of charging a molten material for the foam layer in the cavity, letting at least the slide die move in a predetermined direction in accordance with growth of the foam layer, and releasing the molded article from the main die, the slide die and the movable die. When the foam layer grows at the second step, the slide die moves in the predetermined direction, whereby all of the faces extended in the plurality of directions that make up the foam layer grow so as to satisfy a predetermined expansion ratio.

The method for molding a molded article according to the present invention relates to a method for molding an article made up of a core and a foam layer including faces extended in a plurality of directions using the already-stated molding die.

According to the method for molding a molded article of the present invention, in accordance with the foam growth of the foam layer having faces extended in a plurality of directions, a movable die or a stationary die moves in a die clamping/die opening direction, and at that time the slide die in direct contact with the foam layer can slide in the movement direction allowing all of the faces making up the foam layer to satisfy a same level or a predetermined expansion ratio, and therefore all of the faces making up the foam layer can grow up to a desired expansion ratio.

According to another embodiment of a method is for molding a molded article with a two-layer structure of a core and a foam layer using a molding die including a first stationary die including a first main die and a slide die capable of moving relative to the first main die, a second stationary die, and a movable die including a second main die and an insert that rotates inside the second main die and is assembled to either one of the stationary dies, the core being molded in a first cavity defined by the second stationary die and the movable die, the foam layer being molded on a surface of the core in a second cavity defined by the first stationary die and the movable die, and the foam layer including faces extended in a plurality of directions. The method includes the steps of: a first step of molding the core in the first cavity to be a predetermined shape; and a second step of rotating an angle of the insert of the movable die to define the second cavity by one face of the insert and the slide die, providing the core in the second cavity and charging a molten material for the foam layer in the second cavity, letting at least the slide die move in a predetermined direction in accordance with growth of the foam layer, and releasing the molded article from the main die, the slide die and the movable die. When the foam layer grows at the second step, the slide die moves in the predetermined direction, whereby all of the faces extended in the plurality of directions that make up the foam layer grow so as to satisfy a predetermined expansion ratio.

In the method for molding a molded article of the present invention, as described above, the movable die is made up of a main die and an insert that can rotate inside the main die, whereby the undercut process can be performed effectively when the die is opened after the molding of the core or the molding of the foam layer. Note that a molding die system may be configured in which different stationary dies are provided for molding the core and for molding the foam layer, above which a movable die can be automatically mounted to both of the stationary dies. For instance, two stationary dies and two movable dies are prepared, where the two movable dies can be mounted to both of the stationary dies using a rotation unit. Both of the movable dies are of the same model, to each of which a rotatable insert is mounted. Meanwhile, one of the two stationary dies is for molding the core, which therefore is not provided with the above-stated slide die in the main die (a second stationary die). On the other hand, the other stationary die is provided with the above-stated slide die in the main die, in which after the molded core is accommodated in a cavity on the slide die, a foam layer is molded on a surface thereof (a first stationary die). Herein, the core is molded using the second stationary die and one of the movable dies, the core is detached from the stationary die when the movable die is opened, the movable die provided with the core is shifted above the first stationary die by the rotation of the rotation unit to transfer the core onto the slide die. At this stage, the other movable die is mounted also on the second stationary die, and a separate core is molded between the second stationary die and the movable die, and at the same time the foam layer is molded on the surface of the core between the first stationary die and the movable die. The movable die is opened from the first stationary die, whereby the molded article made up of the core and the foam layer can be released from the stationary die, and the molded article can be obtained by detaching the molded article from the movable die.

The above-stated operation is repeated, whereby the molding of the core and the molding of the molded article can be conducted at the same time and continuously, whereby the molded article can be molded effectively.

Still another embodiment of the method for molding a molded article of the present invention is a method for molding a molded article with a two-layer structure of a core and a foam layer using a molding die including a first stationary die including a first main die and a slide die capable of moving relative to the first main die, a second stationary die, and a movable die including a second main die and an insert that slides inside the second main die and is assembled to either one of the stationary dies, the core being molded in a first cavity defined by the second stationary die and the movable die, the foam layer being molded on a surface of the core in a second cavity defined by the first stationary die and the movable die, and the foam layer including faces extended in a plurality of directions. The method includes the steps of: a first step of molding the core in the first cavity to be a predetermined shape; and a second step of sliding the insert of the movable die to define the second cavity by one face of the insert and the slide die, providing the core in the second cavity and charging a molten material for the foam layer in the second cavity, letting at least the slide die move in a predetermined direction in accordance with growth of the foam layer, and releasing the molded article from the main die, the slide die and the movable die. When the foam layer grows at the second step, the slide die moves in the predetermined direction, whereby all of the faces extended in the plurality of directions that make up the foam layer grow so as to satisfy a predetermined expansion ratio.

The method for molding a molded article of the present invention relates to a method for molding a molded article using a molding die in which the already-stated slidable insert is mounted to the movable die instead of a rotatable insert, and the configuration of the molding die system and the flow of the molding method are similar to the above-stated molding method.

In a further embodiment of the method for molding a molded article of the present invention, the molding die further includes a sensor that detects whether the slide die moves in the predetermined direction or not, and at the second step, if a result of detection by the sensor is beyond a predetermined threshold value, movement of the slide die and the movable die is stopped.

Herein, the predetermined direction in which the slide die moves refers to the already-stated combined vector direction, for example, and a system may be configured so that a sensor detects that the slide die is not in contact with the inner wall face of the movable die to which the slide die is to be in contact with when the foam layer is molded. In the case of a pressure sensor used as the sensor, a certain pressure value may be set as a threshold, and if a detection result is less than the threshold, the operation of the slide die and the movable die is stopped. On the other hand, in the case of a limit switch used as the sensor, the system may be configured so that if the limit switch does not turn ON when the slide die slides along the inner wall face of the movable die, the operation of the slide die and the movable die is stopped.

According to the method for molding a molded article of the present invention, the article can be molded while confirming that all of the faces of the foam layer extended in a plurality of directions grow for foaming desirably, and therefore the production of defective molded articles can be prevented.

As can be understood from the above description, according to the molding die and the method for molding a molded article of the present invention, a slide die making up a stationary die moves in an appropriate direction different from the movement direction of the movable die or the stationary die, i.e., the die clamping direction/die opening direction, and therefore the molded article can be molded so that all of the faces of the foam layer extended in a plurality of directions can have desired softness.

BRIEF DESCRIPTION OF THE DRAWINGS

FIG. 8a illustrates the state where die-clamping is conducted with respect to a core, FIG. 8b illustrates the state where the movable die is partially opened, FIG. 8c illustrates the state where the insert is slid, FIG. 8d illustrates the state where a foam layer is molded on a surface of the core in a cavity between a separate stationary die and the insert, and FIG. 8e illustrates the state where the molded article is taken out.

FIG. 9a illustrates the state of the insert when the core is molded, FIG. 9b illustrates the state of the insert when the foam layer is molded, FIG. 9c illustrates the state where the insert is rotated for taking out the molded article, and FIG. 9d illustrates the state where the molded article is taken out.

Figure 1:
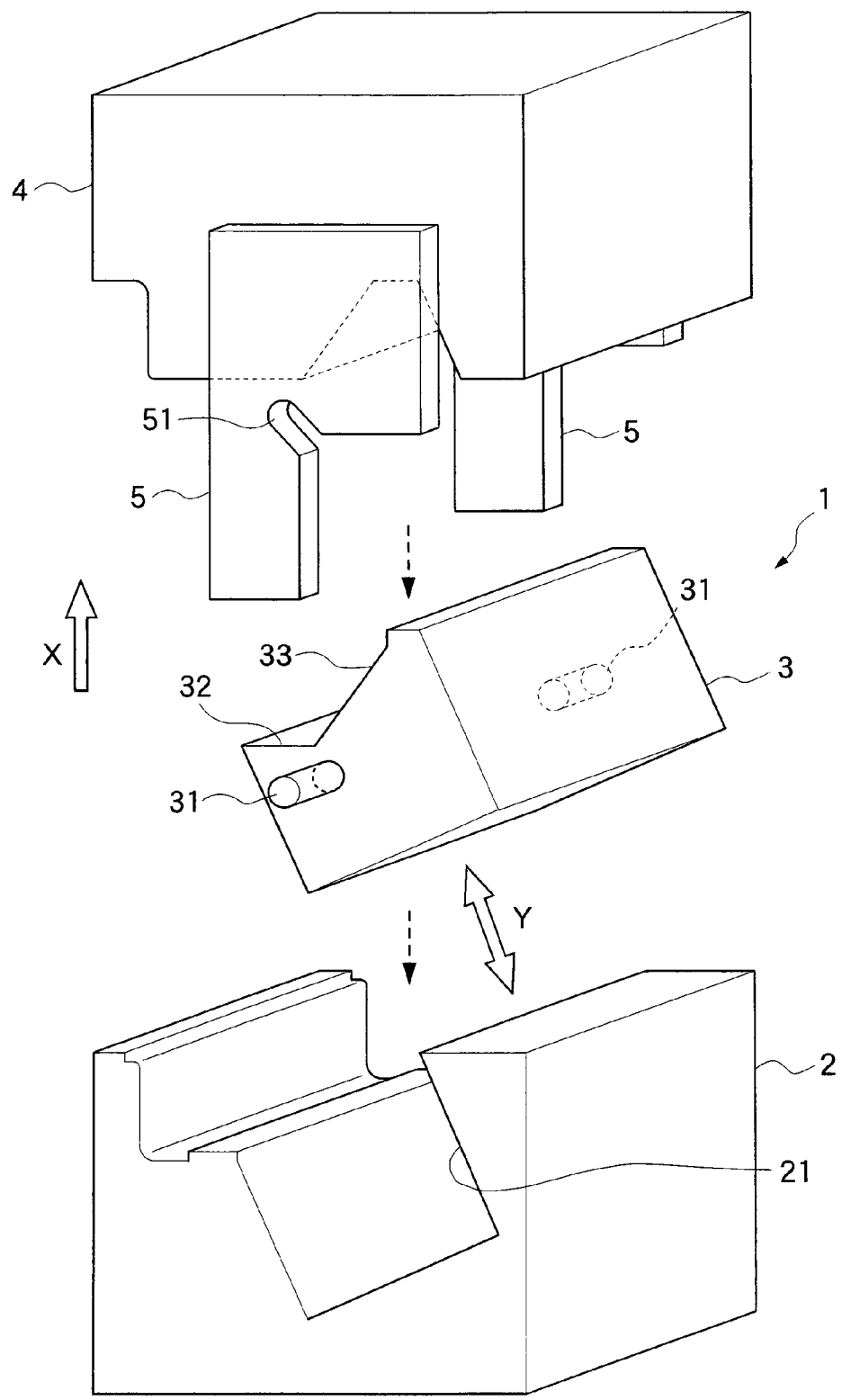
FIG. 1 is an exploded perspective view of one embodiment of a molding die of the present invention.

In these drawings, the respective reference numerals denote as follows:

1, 1a, 1b, 1c molding die
2 main die (stationary die)
21 accommodation space
3 slide die
31 shaft member
4 movable die
5 cam plate
51 guide groove
6 servo motor
71 screw shaft
72a, 72b nut
73a, 73b leg member
8 sensor
9 hydraulic cylinder
100 molding die system
C cavity
a molded article
a1 core
a2 foam layer.

BEST MODE FOR CARRYING OUT THE INVENTION

Figure 2:
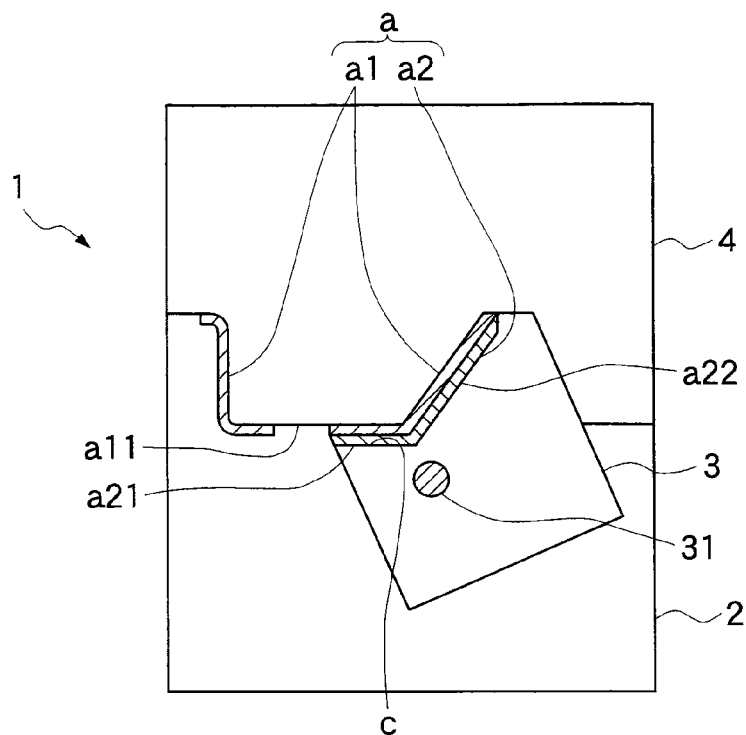
FIG. 2 is a front view of the molding die showing the state where a core is molded in a cavity.
Figure 3:
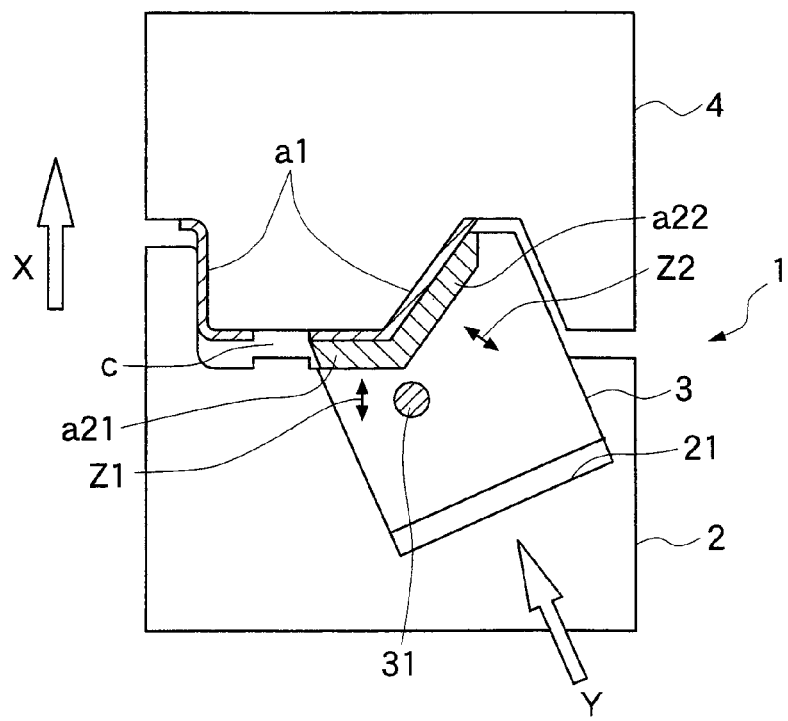
FIG. 3 is a front view of the molding die showing the state where a foam layer is molded in a cavity.
Figure 4:
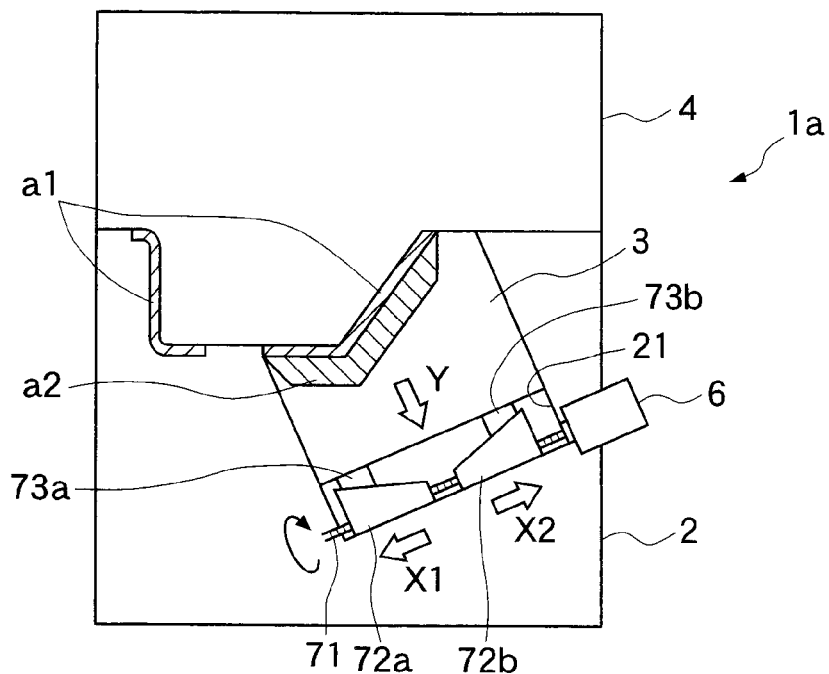
FIG. 4 schematically shows another embodiment of the molding die.
Figure 5:
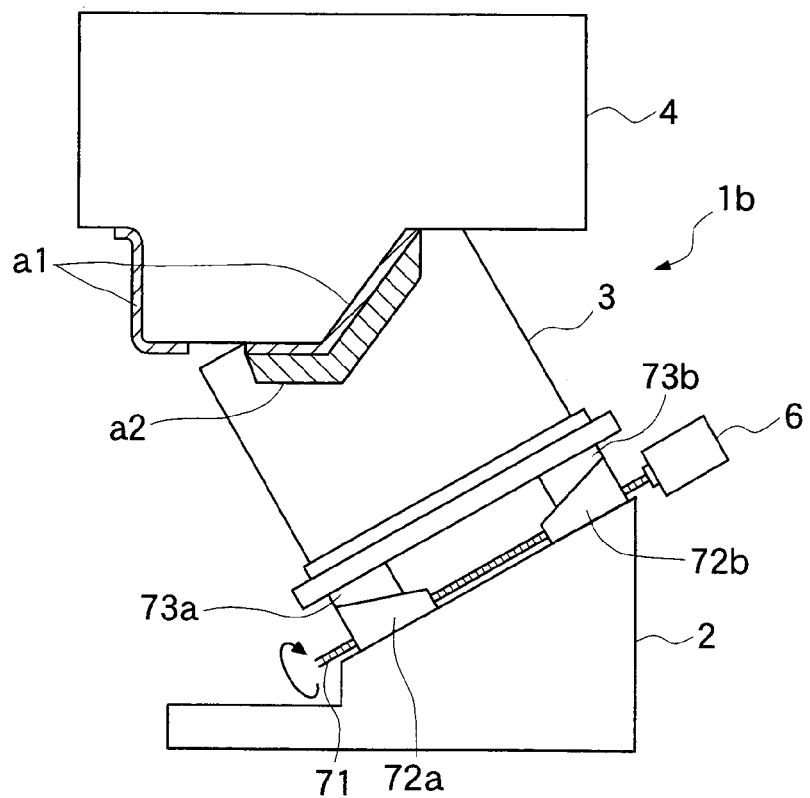
FIG. 5 schematically shows still another embodiment of the molding die.
Figure 6:
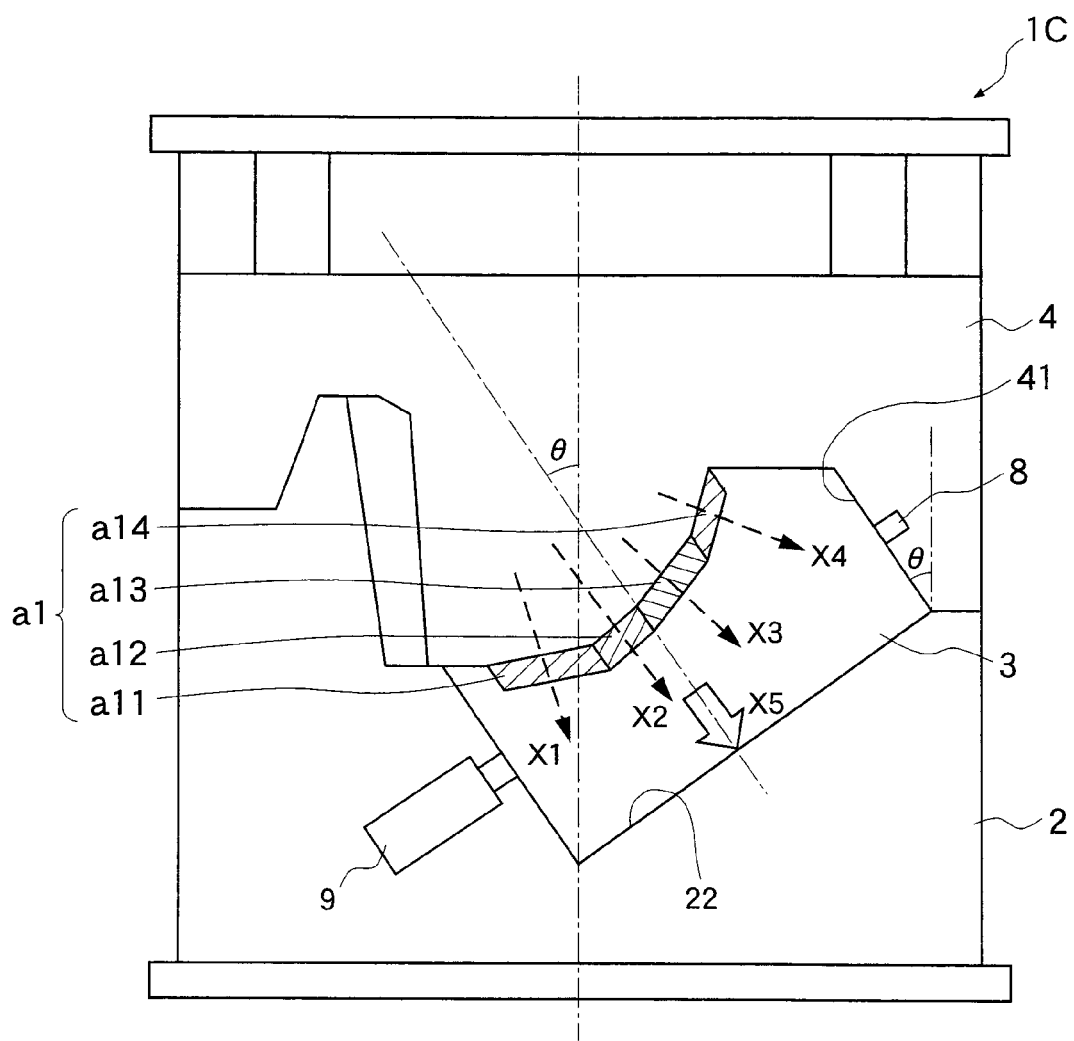
FIG. 6 schematically shows a further embodiment of the molding die, showing the state where a core is provided in a cavity.
Figure 7:
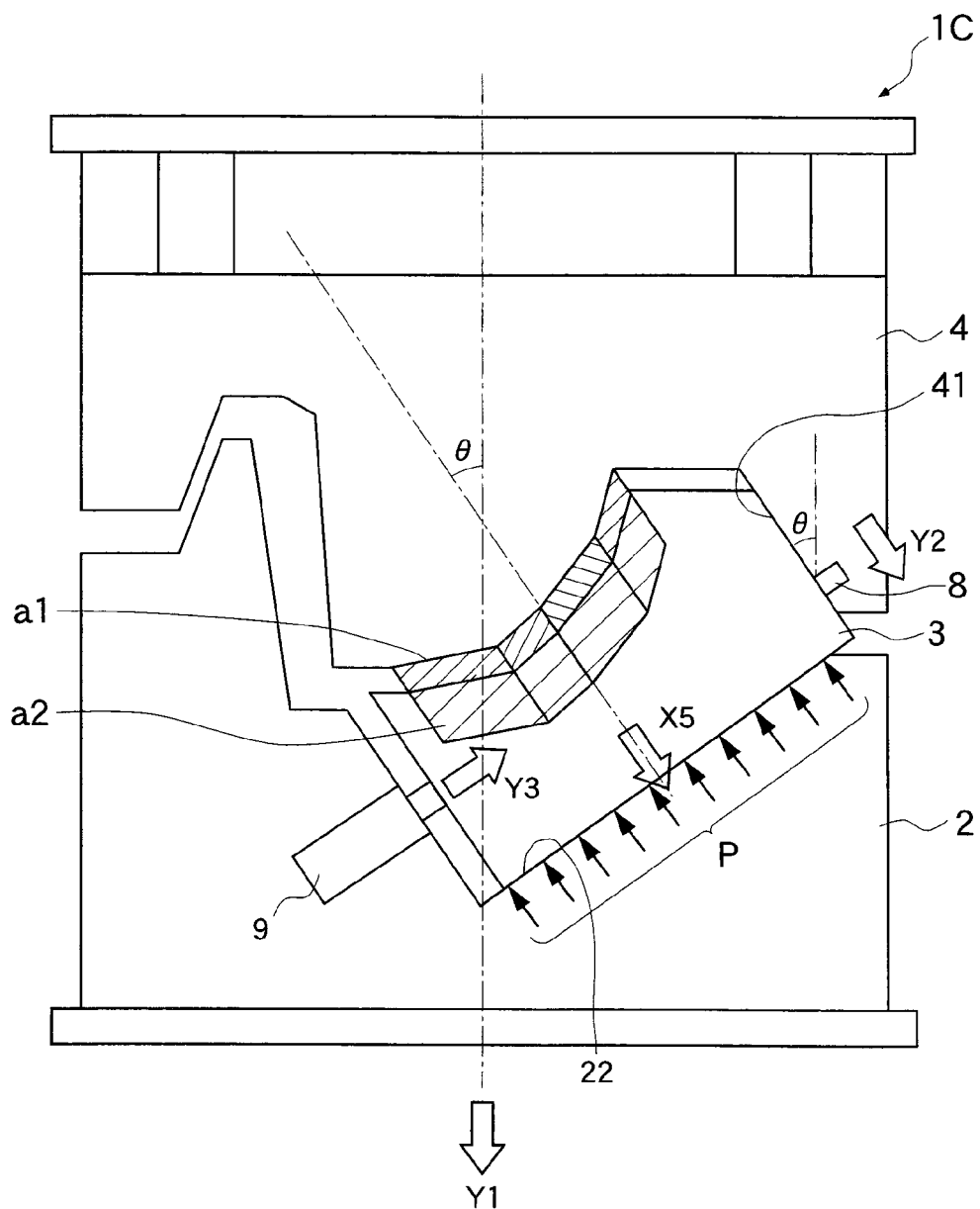
FIG. 7 shows the state where a foam layer grows on a surface of the core in the embodiment of FIG. 6.
Figure 8:
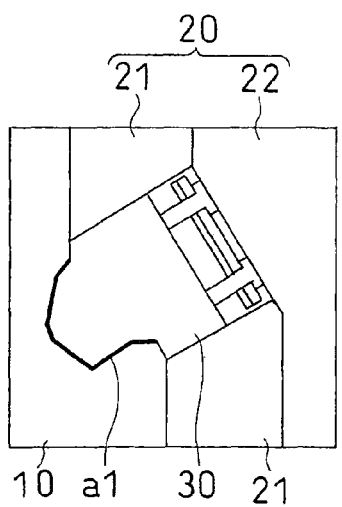
FIG. 8 shows the states of die-opening, die-closing and taking-out of a molded article in a molding die having a movable die provided with a slide-type insert, where
Figure 8:
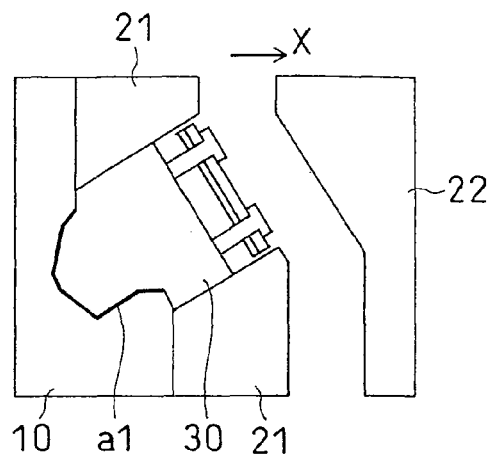
Figure 8:
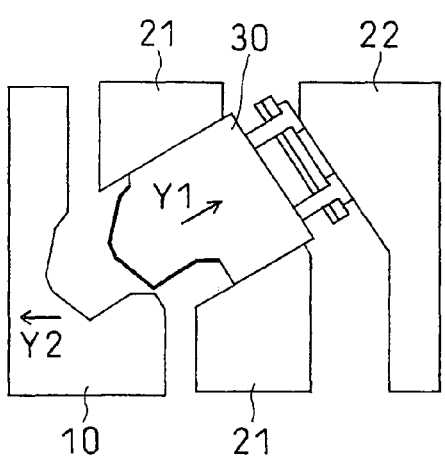
Figure 8:
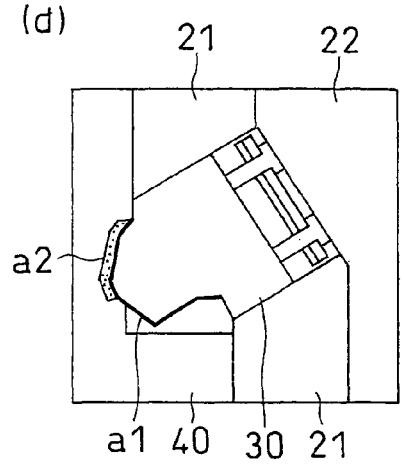
Figure 8:
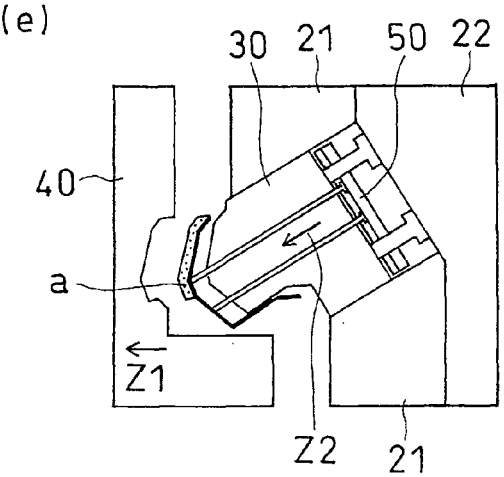
Figure 9:
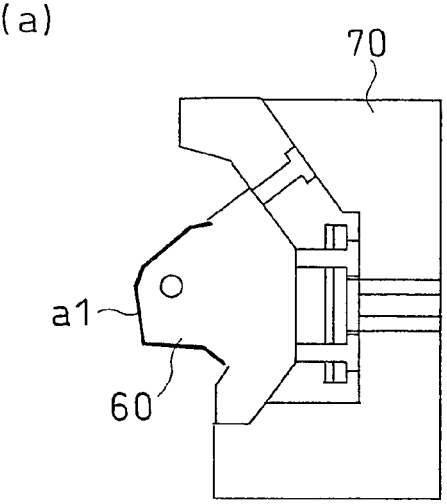
FIG. 9 illustrates the states where using a movable die provided with a rotary insert, a core is molded, a foam layer is molded and a molded article is taken out, where
Figure 9:
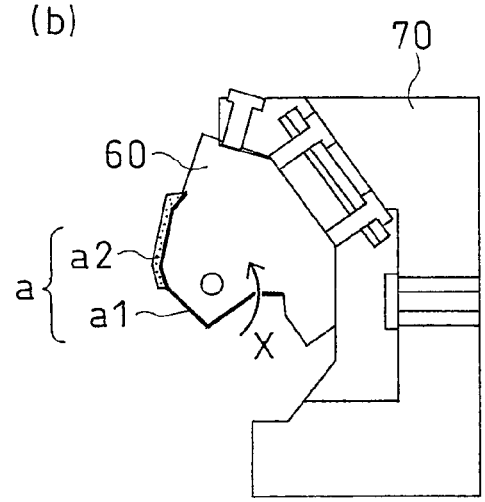
Figure 9:
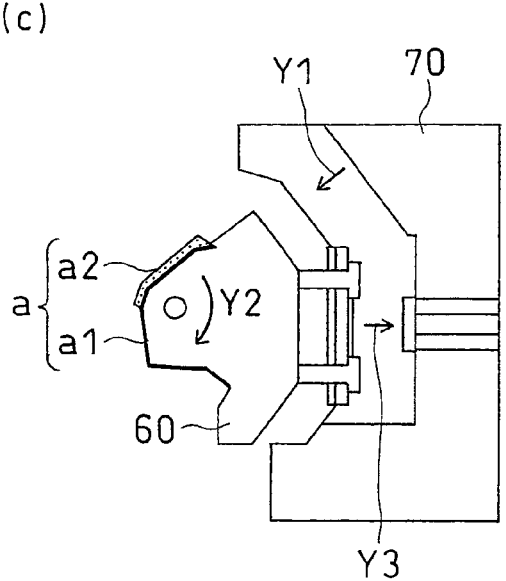
Figure 9:
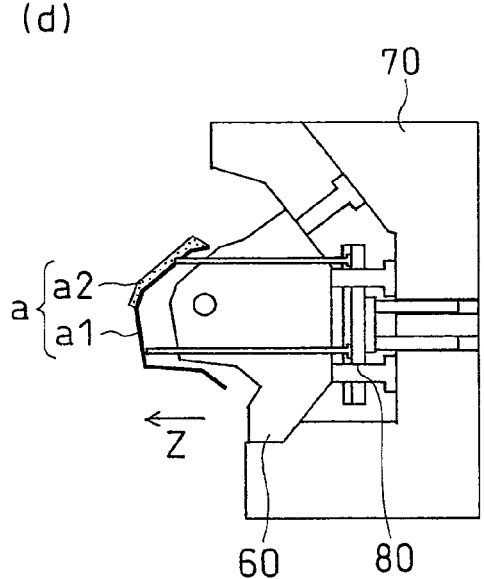
Figure 10:
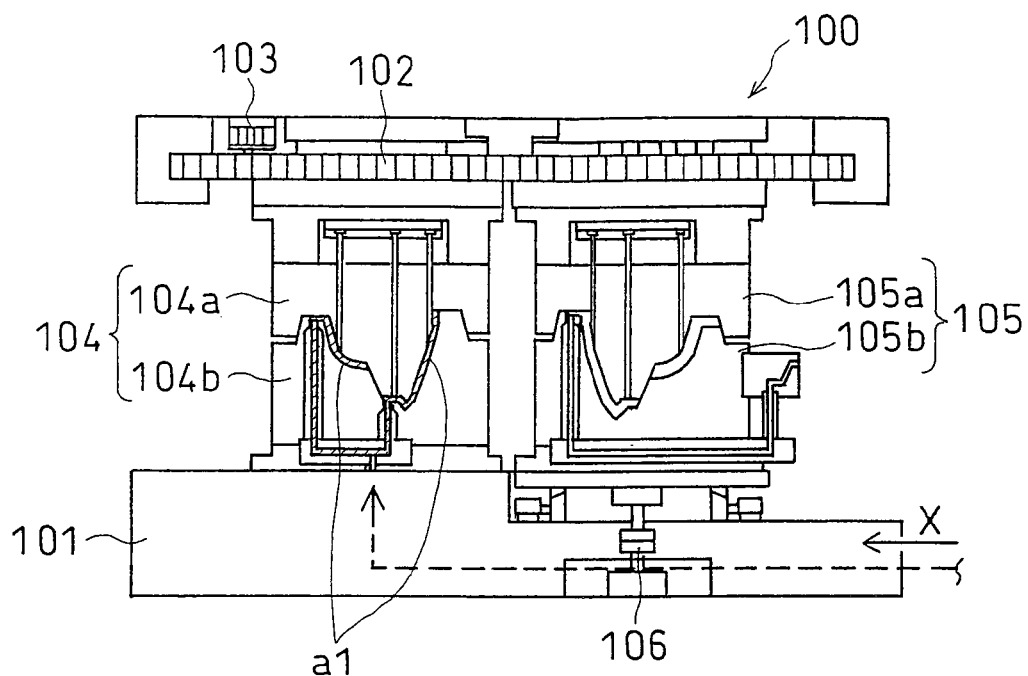
FIG. 10 illustrates a method for molding an article using a system made up of two stationary dies and two movable dies, showing the state of molding a core.
Figure 11:
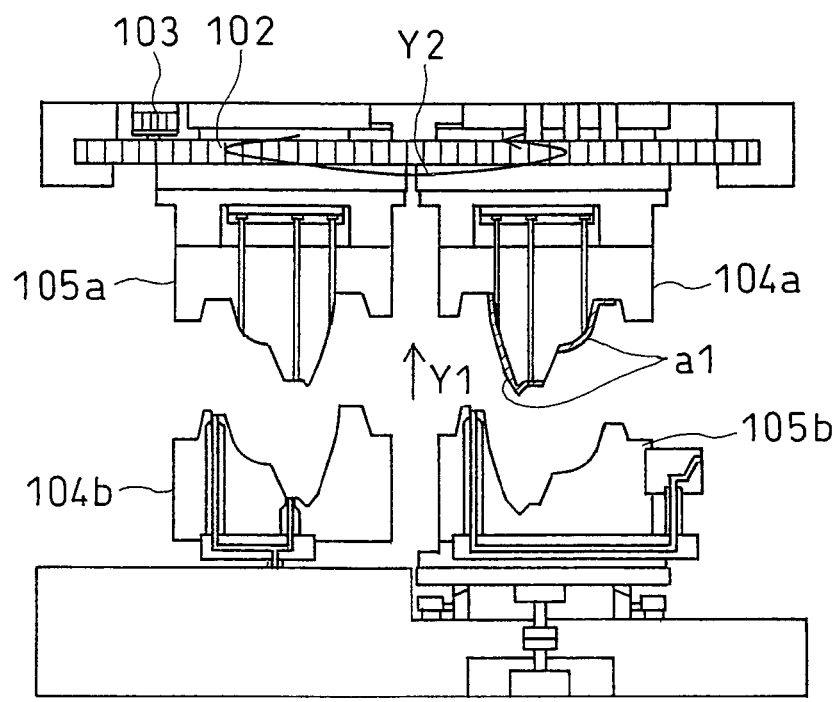
FIG. 11 illustrates the state of die-opening following FIG. 10.
Figure 12:
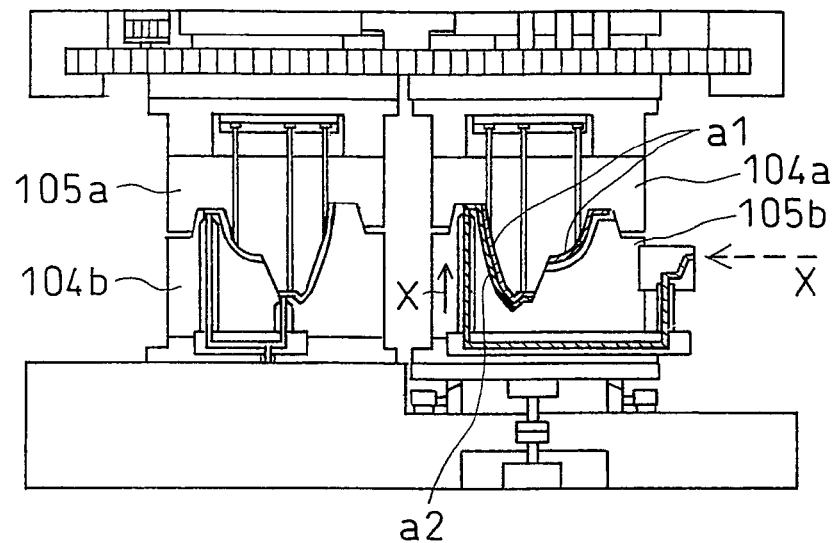
FIG. 12 illustrates the state following FIG. 11 where a foam layer is molded.
Figure 13:
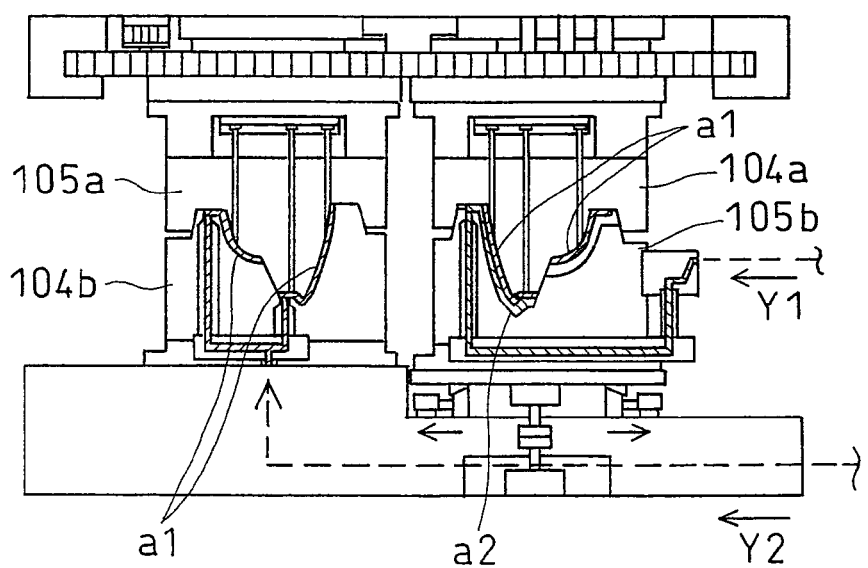
FIG. 13 illustrates the state following FIG. 12 where one of the molding dies prepares for the die release and the other molding die molds the core.
Figure 14:
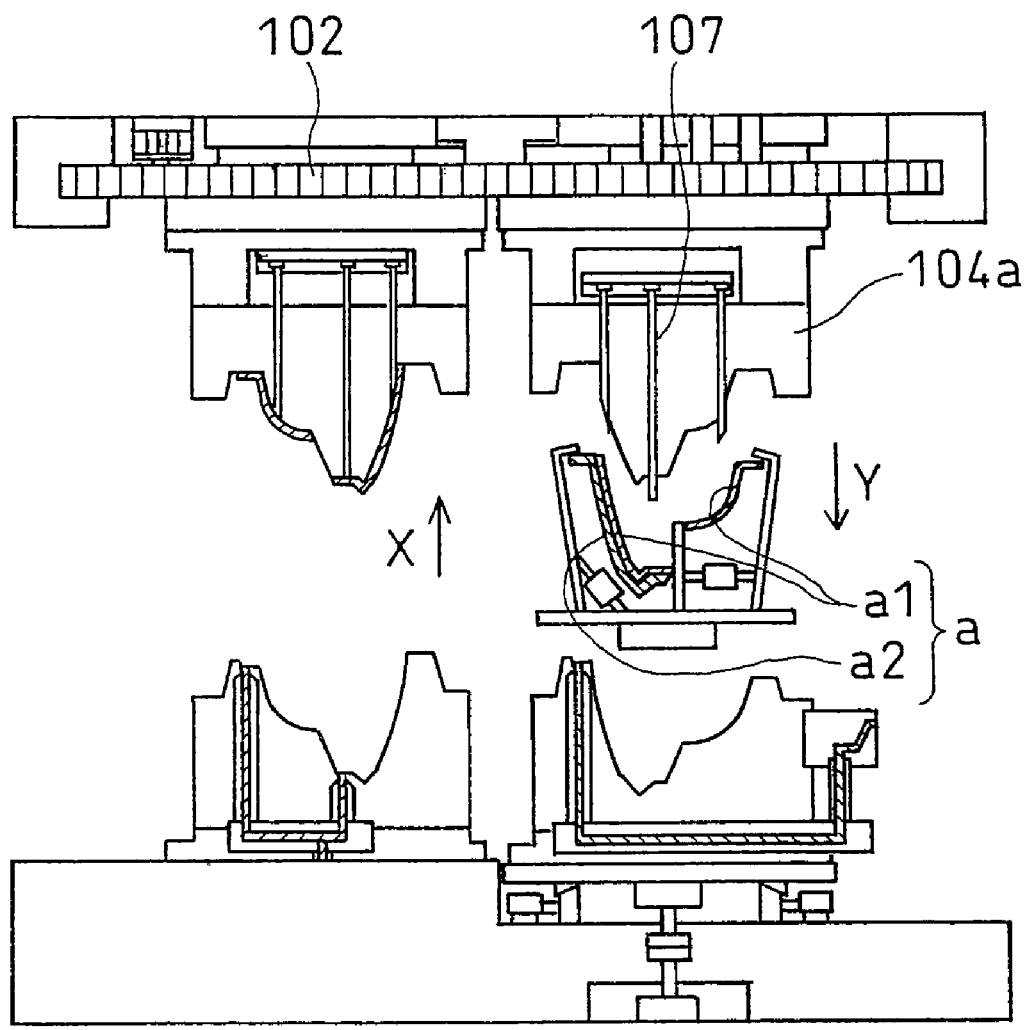
FIG. 14 illustrates the state following FIG. 13 where both of the molding dies are opened and the molded articles are taken out.
Figure 15:
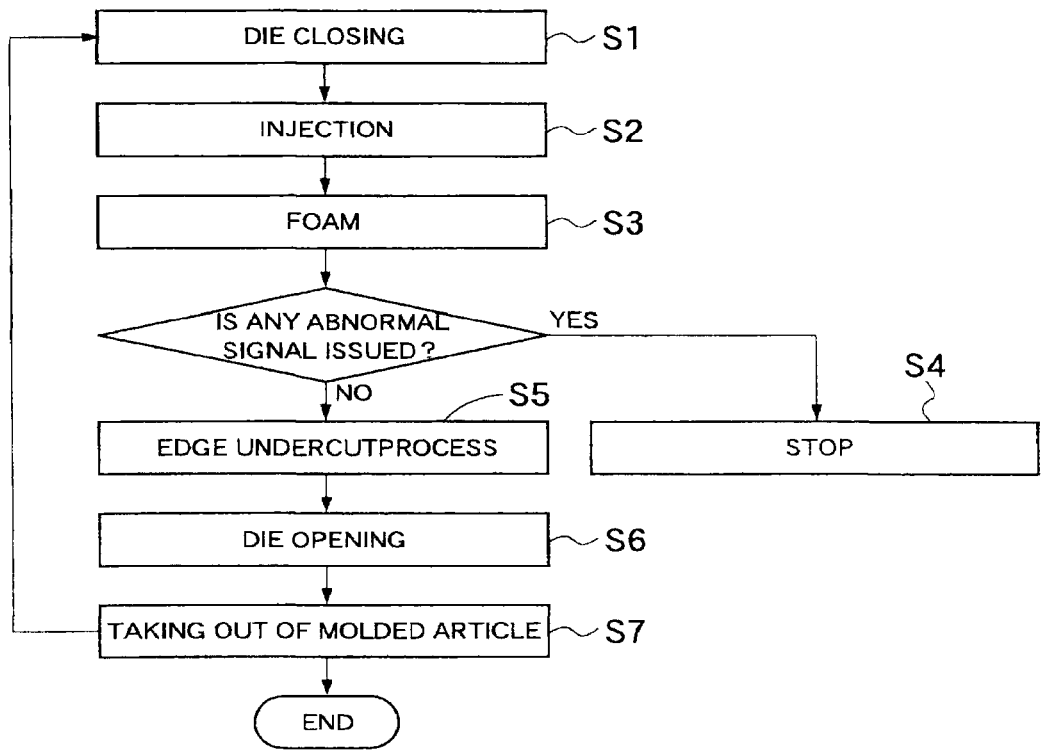
FIG. 15 is a flowchart showing one embodiment of the molding method for molding a foam layer.
Figure 16:
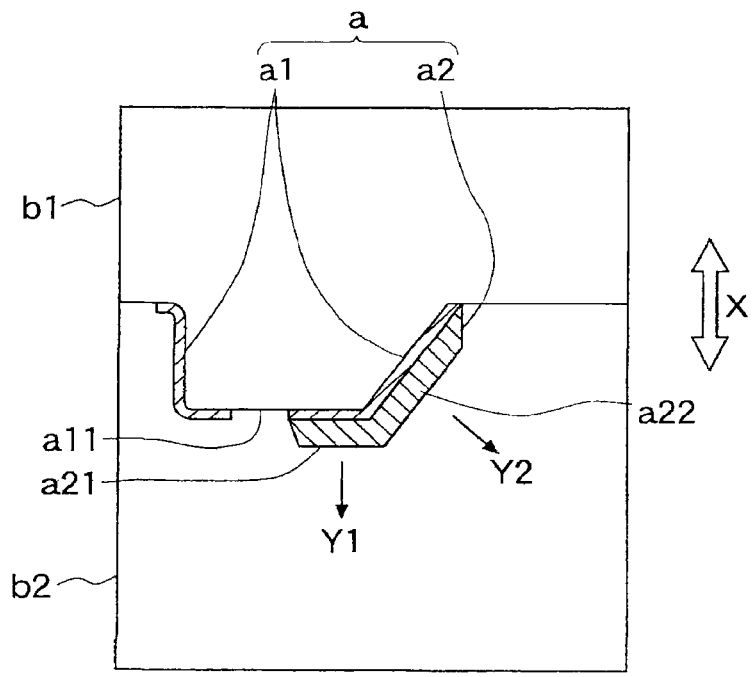
FIG. 16 schematically shows the state where a foam layer grows in a cavity of a conventional molding die.

In the following, embodiments of the present invention will be described with reference to the drawings. FIG. 1 is an exploded perspective view of one embodiment of a molding die of the present invention, FIG. 2 is a front view of the molding die showing the state where a core is molded in a cavity, and FIG. 3 is a front view of the molding die showing the state where a foam layer is molded in a cavity. FIGS. 4 and 5 schematically show other embodiments of the molding die. FIG. 6 schematically shows still another embodiment of the molding die, showing the state where a core is provided in a cavity, and FIG. 7 shows the state where a foam layer grows on a surface of the core in the embodiment of FIG. 6. FIG. 8 shows the states of die-opening, die-closing and taking-out of a molded article in a molding die having a movable die provided with a slide-type insert, where FIG. 8a illustrates the state where die-clamping is conducted with respect to a core, FIG. 8b illustrates the state where the movable die is partially opened, FIG. 8c illustrates the state where the insert is slid, FIG. 8d illustrates the state where a foam layer is molded on a surface of the core in a cavity between a separate stationary die and the insert, and FIG. 8e illustrates the state where the molded article is taken out. FIG. 9 illustrates the states where using a movable die provided with a rotary insert, a core is molded, a foam layer is molded and a molded article is taken out, where FIG. 9a illustrates the state of the insert when the core is molded, FIG. 9b illustrates the state of the insert when the foam layer is molded, FIG. 9c illustrates the state where the insert is rotated for taking out the molded article and FIG. 9d illustrates the state where the molded article is taken out. FIG. 10 illustrates a method for molding an article using a system made up of two stationary dies and two movable dies, showing the state of molding a core, FIG. 11 illustrates the state of die-opening following FIG. 10, FIG. 12 illustrates the state following FIG. 11 where a foam layer is molded, FIG. 13 illustrates the state following FIG. 12 where one of the molding dies prepares for the die release and the other molding die molds the core, and FIG. 14 illustrates the state following FIG. 13 where both of the molding dies are opened and the molded articles are taken out. FIG. 15 is a flowchart showing one embodiment of the molding method for molding a foam layer.

FIG. 1 is an exploded perspective view of one embodiment of a molding die. A molding die 1 is roughly made up of a main die 2 constituting a stationary die and a movable die 4, and is provided with a slide die 3 that is movable in a predetermined direction inside an accommodation space 21 bored on one side of the main die 2 facing the cavity. The movable die 4 is movable in X direction that is perpendicularly upward with respect to the main die 2, and this X direction is the die clamping/die opening direction. On the other hand, the slide die 3 is loosely fitted in the accommodation space 21 to be movable in Y direction different from X direction. Herein, the inner dimension of the accommodation space 21 is set larger than the dimension of the slide die 3 so as not to inhibit the movement of the slide die 3. The movement of the slide die 3 in Y direction is substantially determined by the shape of the accommodation space 21. Herein, in the illustrated embodiment of the slide die 3, the shape of the slide die 3 facing the cavity space is made up of a face 32 extended in the direction orthogonal to the die clamping/die opening direction (X direction) and a face 33 rising at a predetermined inclination angle with respect to the face 32 (the shape of the foam layer will be made up of such two faces). However, the shape of the slide die 3 facing the cavity space can be set appropriately depending on the shape of the foam layer to be molded.

Further, two cam plates 5, 5 are attached to sides of the movable die 4 to allow the movable die 4 to move in the arrow X direction without the displacement in the horizontal direction when a foam layer grows for foaming, and each cam plate 5 is provided with a guide groove 51 bored therein in which a shaft member 31 is loosely fitted. This guide groove 51 is bored in a direction capable of serving as means for moving the slide die (Y direction). The slide die 3 is placed in the accommodation space 21 of the main die 2 and the movable die 4 is mounted to the main die 2 while letting the shaft members 31, 31 at both ends of the slide die 3 loosely fitted into the guide grooves 51, 51 of the cam plates 5, 5, whereby the molding die 1 is assembled. Such a molding die 1 includes the slide die in addition to a conventional molding die, which is adapted so as to move in a direction different from the die clamping/die opening direction of the movable die. Since this molding die 1 has a relatively simple configuration, it can be manufactured at a cost equivalent to that for the conventional molding die.

FIG. 2 shows the state of the molding die 1 where after a core a1 with an aperture a11 is press-molded, a resin material for foam layer in a molten state at a high temperature is charged into a cavity C through an injection hole not illustrated. Herein, the shape of the foam layer a2 to be molded includes a face a21 extended in the direction orthogonal to the die clamping/die opening direction (X direction) and a face a22 rising at a predetermined inclination angle from the face a21. Needless to say, this cavity C is an enclosed space. Incidentally, similarly to the foam layer, the core a1 can be molded by injection molding instead of the press molding.

FIG. 3 shows the molding die 1 when the foam layer a2 grows. After the charging of the resin material into the cavity C, bubbles made of $CO_2$ gas dissolved in the resin material are generated and grow with the passage of time. As these bubbles are generated and grow, the foam layer a2 grows and the thickness of the foam layer a2 is increased. In the present embodiment, the face a21 of the foam layer a2 will grow in Z1 direction, while the face a22 thereof will grow in Z2 direction. As the foam layer a2 grows in this way, the movable die 4 is lifted perpendicularly upward (X direction) and moved.

As the movable die 4 moves, the foam layer a2 grows for foaming upward (Z1, Z2 directions), while keeping the attitude such that one side thereof is attached to the core a1, and the other side grows for foaming downward (Z1, Z2 directions). Herein, the boring direction of the guide grooves 51 bored in the cam plates 5 attached to the movable die 4 not illustrated in this drawing determines the movement direction (Y direction) of the slide die 3. In the present embodiment, this Y direction is set at an angle direction of ½ of the central angle between the face a21 and the face a22, whereby in accordance with the movement of the slide die 3 in Y direction, the foam growth of the both of the face a21 and the face a22 constituting the foam layer a2 can be promoted, so that all of the faces constituting the foam layer can grow so as to satisfy a desired expansion ratio.

As is also clear from FIG. 3, the movement direction of the movable die 4, i.e., the die clamping/die opening direction is determined in a certain direction depending on the shape or the aperture of the core a1, and the movement in other directions is not allowed by the interference of the die with the core a1. Based on such a condition as a precondition, in order to promote the foam growth of all faces of the foam layer having a plurality of angle faces sufficiently, another movable means moving separately from the movement of the movable die is required, and therefore the slide die is applied as such separate movable means in the present invention. The movement direction of the slide die will be determined depending on the shape of the foam layer so as to allow the foam growth of all of the faces to be promoted.

FIG. 4 schematically shows another embodiment of the molding die. This molding die 1a includes a main die 2 as a stationary die provided with an accommodation space 21 accommodating a slide die 3 therein and further provided with a feed screw mechanism below the accommodation space 21 that is driven by a servo motor 6. The servo motor 6 includes a rotary shaft to which a screw shaft 71 is mounted, and to the screw shaft 71, two nuts 72a and 72b are turnably attached with an interval therebetween. These two nuts 72a and 72b can move relatively away from each other as the screw shaft rotates (X1, X2 directions). The upper faces of the nuts 72a and 72b are formed to be inclined so that both of the nuts 72a and 72b are inclined downward toward their opposing nuts.

Meanwhile, to a lower portion of the slide die 3, two leg members 73a and 73b are attached, where the two leg members 73a and 73b are shaped to be fitted to the nuts 72a and 72b, respectively, so as to be slidable on the nuts 72a and 72b. That is to say, the leg members 73a and 73b are both shaped to be inclined downward toward their opposing leg members.

The rotation of the servo motor 6 causes the rotation of the screw shaft 71, the rotation of the screw shaft 71 causes the movement of the nuts 72a and 72b so that they are away from each other, and such movement of the nuts causes the leg members 73a and 73b to slide on the nuts. As a result, the slide die 3 can move downward (Y direction).

It is desirable that the rotation of the servo motor 6 is adjusted so that the slide die 3 can move downward in accordance with the foam growth of the foam layer. For instance, in an applicable embodiment, the rotating speed of the servo motor is set beforehand in accordance with a foam growth property of a resin material used for the foam layer. In another applicable embodiment, a not-illustrated pressure sensor is embedded in the cavity face of the slide die 3, and when a predetermined pressure is applied to the slide die 3 in accordance with the foam growth of the foam layer, the servo motor drives to move the slide die by a predetermined amount.

According to the embodiment of FIG. 4, there is no need for the movable die 4 to move in the die clamping/die opening direction in accordance with the foam growth of the foam layer. That is, the foam growth of the foam layer can be handled only by the movement of the slide die inside the main die. Further, by setting the rotation of the servo motor appropriately, it is also possible to cause the optimum foam growth (the growth satisfying an appropriate expansion ratio) of the foam layer artificially. This means that a relationship between the timing of the cavity space formation and the foam growth speed of the foam layer is specified, and the rotation of the servo motor is determined so as to allow the cavity space to be formed at the optimum timing.

FIG. 5 schematically shows still another embodiment of the molding die. In this molding die 1b, a main die 2 is placed as a base of a servo motor 6 and a feed screw mechanism, and a slide die 3 moves in a predetermined direction on this main die 2 in a similar manner to the molding die 1a, thus promoting the foam growth of all faces of the foam layer.

Since the molding die 1b can save the trouble of manufacturing such as boring the accommodation space as compared with the molding die 1a, the cost for manufacturing a die can be further reduced.

FIG. 6 schematically shows a further embodiment of the molding die. This molding die 1c includes a main die 2 accommodating a slide die 3 slidably therein, and one side of the slide die 3 can be pushed out by a hydraulic cylinder 9.

The illustrated core a1 is made up of faces a11, a12, a13 and a14 extended in four directions. It is assumed that the areas of the respective faces are A1, A2, A3 and A4 and the directions orthogonal to the respective faces are X1, X2, X3 and X4. The direction of the combined vector of the respective faces can be calculated as $X5=(a11 \cdot A1+a12 \cdot A2+a13 \cdot A3+a14 \cdot A4)/(A1+A2+A3+A4)$. The molding die 1c is configured so that the combined vector of the core made up of faces extended in a plurality of directions is firstly calculated, a face 22 of a stationary die 2 extended in the direction orthogonal to this combined vector is subjected to a pressure applied when a foam layer is molded and similarly the slide die 3 is pushed out in the direction orthogonal to the combined vector. In this drawing, the combined vector forms the angle θ with respect to the illustrated die clamping/die opening direction. Incidentally, even in the case where the shape of a core (and a foam layer) is made up of faces other than the above-stated four faces, the combined vector can be calculated in a similar manner.

Further, in the movable die 4, an inner wall face 41 that is brought into contact with a face of the slide die 3 on the opposite side of the hydraulic cylinder 9 also is set in the θ direction that is the combined vector direction. Moreover, the inner wall face 41 includes an appropriate sensor 8 built therein such as a contact image sensor, a pressure sensor or a limit switch.

FIG. 7 illustrates the state where the foam layer a2 is expansion molded on the surface of the core a1 (the state where the foam layer a2 grows for foaming). In the illustrated embodiment, in accordance with the foam growth of the foam layer a2, the stationary die 2 located below the movable die 4 moves in the die clamping/die opening direction. In accordance with the foam growth of the foam layer a2, the stationary die a2 moves in Y1 direction, and the slide die 3 is slid (Y3 direction) on the inner wall face 22 of the stationary die 2 in synchronization with the movement of the stationary die 2. When the stationary die 2 moves, the slide die 3 can slide in the combined vector direction (θ direction) relative to the movable die 4 so as to be guided by the inner wall face 41 of the movable die 4 (Y2 direction). The sliding of the slide die 3 in the combined vector direction enables all of the faces of the foam layer a2 in a plurality of directions to grow so as to satisfy a predetermined expansion ratio.

Further, the sensor 8 built in the inner wall face 41 of the movable die 4 allows the contact of the slide die 3 with the inner wall face 41 to be confirmed securely, and moreover allows the sliding of the slide die 3 in the combined vector direction to be confirmed securely. Note that although not illustrated, this sensor is connected with a computer, where the computer is configured so that if an output from the sensor is read out, which shows that the slide die 3 is not in contact with the inner wall face 41, then appropriate alarm means built in the computer can inform an operator of such (to display such on a screen). As the alarm means, an alarm further may be provided.

As shown in FIG. 7, a pressure P, P in the combined vector direction that becomes the largest when the foam layer a2 grows for foaming is received at the inner wall face 22 of the stationary die 2, whereby a pressure acting on the pushing-out direction of the hydraulic cylinder 9 that is orthogonal thereto can be made significantly small. Thus, the performance or the specifications of the hydraulic cylinder applied can be made as small as possible. Incidentally, a lubricant agent for reducing dynamical friction may be applied between the lower face of the slide die 3 and the inner wall face 22 of the stationary die 2, or a not-illustrated bearing may be provided at the inner wall face 22, whereby the friction resistance of the slide die 3 during sliding can be reduced.

FIG. 8 shows the states of die-opening, die-closing and taking-out of a molded article using a molding die having a movable die provided with a slide-type insert. As shown in FIG. 8a, a movable die 20 is separated into two parts (separate unit 21, separate unit 22), and an insert 30 is accommodated slidably in the separate unit 21. In FIG. 8a, a core a1 is molded in a cavity between the insert 30 and a stationary die 10.

After molding the core a1, the process progresses to FIG. 8b, where the separate unit 22 making up the movable die 20 is separated from the separate unit 21 (X direction). Further, when the stationary die 10 is separated from the separate unit 21, as shown in FIG. 8c, the insert 30 is slid in Y1 direction for performing an undercut process, and then the stationary die 10 is moved to the opposite side of the separate unit 21 (Y2 direction).

Subsequently, the separate unit 21 and the separate unit 22 are combined, and a cavity is formed between a stationary die 40 for molding a foam layer and the insert 30. Into this cavity, a mixture of olefin resin (TPO material) and $CO_2$ gas, for example, is charged, so as to mold the foam layer a2 on the surface of the core a1 (FIG. 8d).

After molding a desired molded article a, the stationary die 40 is slid so as to be separated from the movable die (Z1 direction of FIG. 8e), and the molded article a is pushed out by a pushing-out mechanism 50 mounted to the insert 30, whereby the molded article a can be obtained.

FIG. 9 illustrates the states where using a movable die provided with a rotary insert, a core is molded, a foam layer is molded and a molded article is taken out. As shown in FIG. 9a, an insert 60 is attached rotatably to a movable die 70, and a core a1 is molded between this insert 60 and a not-illustrated stationary die.

Following this, the stationary die and the movable die are separated, and the insert 60 is rotated relative to the movable die 70 (X direction of FIG. 9b), and then a foam layer a2 is molded on the surface of the core a1 between the not-illustrated stationary die and the insert 60.

The process progresses to FIG. 9c, where after molding the foam layer, the stationary die and the movable die are separated, the insert 60 is slid with respect to the movable die 70 (Y1 direction) and is rotated to be brought back to the original position (Y2 direction), and then the insert 60 is pulled back (Y3 direction). Finally, the molded article a is pushed out from the insert 60 by a pushing-out mechanism 90, whereby the molded article a can be obtained.

Referring now to FIGS. 10 to 14, the following describes a method for molding an article using a molding die system made up of two movable dies and two stationary dies.

This molding die system 100 includes two stationary dies 104b and 105b mounted in parallel on a base 101, above which a disc 102 that is rotatable by a servo motor 103 is provided vertically movably, and at a lower face of the disc 102, two movable dies 104a and 105a are provided fittably to the stationary dies 104b and 105b, respectively. Firstly, as shown in FIG. 10, an appropriate resin material such as polypropylene material is fed into a cavity of the molding die 104 made up of the movable die 104a and the stationary die 104b (X direction) to mold a core a1. Subsequently, the process progresses to FIG. 11, where the disc 102 moves upward (Y1 direction) and is rotated by 180 degrees (Y2 direction), whereby the movable die 105a is provided above the stationary die 104b and the movable die 104a is provided above the stationary die 105b. Herein, since both of the molding dies 104 and 105 are configured to have a line-symmetric relationship with reference to a rotation central axis of the disc 102, the stationary die 104b and the movable die 105a are fittable to each other, and the stationary die 105b and the movable die 104a are fittable to each other.

The process progresses to FIG. 12, where the disc 102 moves downward, so that the stationary die 104b and the movable die 105a are fitted to each other and the stationary die 105b and the movable die 104a are fitted to each other. Thereafter, a mixture of olefin resin (TPO material) and $CO_2$ gas, for example, is fed into a cavity of the stationary die 105b and the movable die 104a (X direction) to mold the foam layer a2 on the surface of the core a1. On the other hand, as shown in FIG. 13, an appropriate resin material such as polypropylene material is fed into a cavity of the stationary die 104b and the movable die 105a (Y direction) to mold a core a1.

Subsequently, the process progresses to FIG. 14, where after molding an article a in the cavity of the stationary die 105b and the movable die 104a, the disc 102 moves upward (X direction), and the molded article a is pushed out by a pushing-out mechanism 107 accommodated in the movable die 104a, whereby the molded article a can be obtained.

The above operation is performed repeatedly, whereby a molded article can be molded effectively by automatic control.

FIG. 15 shows the flow when a foam layer is molded on the surface of a core, especially showing the molding flow using the molding die 1c of FIGS. 6 and 7. Firstly, a die is closed while accommodating a core in a cavity between a stationary die and a movable die (Step S1). Next, a mixture of an appropriate resin and $CO_2$ gas, for example, is injected into the cavity (Step S2), and then the mixture foams within the cavity (Step S3). In accordance with this foam growth, the above-stated slide die moves in a predetermined direction, whereas the stationary die or the movable die moves in the die clamping/die opening direction.

In order to find out whether the slide die is surely in contact with an inner wall face of the movable die, confirmation is conducted as to whether a sensor issues an abnormal signal or not. For instance, if a limit switch is not turned ON, an abnormal signal is sent to a computer. Herein, if there is an abnormal signal issued, the movement of the slide die and the stationary die or the movable die is stopped, so as to conduct the checking/fixing of the molding die (Step S4).

On the other hand, if there is no abnormal signal issued, while an edge undercut process is conducted with respect to the stationary die and the movable die (Step S5), the die is opened (Step S6). This die-opening may be performed by opening the stationary die or by opening the movable die.

After the die-opening, the molded article is taken out, whereby the molded article can be obtained (Step S7). Steps S1 to S7 are repeated number of times corresponding to the desired number of molded articles, whereby the molded articles in desired number can be obtained.

Although the embodiments of the present invention have been described in detail with reference to the drawings, the specific configuration is not limited to these embodiments, and the design may be modified without departing from the subject matter of the present invention, which falls within the present invention.

The invention claimed is:

1. A molding die comprising a stationary die and a movable die, the molding die being for molding a molded article in a cavity defined between both of the dies, the molded article having a two-layer structure of a core and a foam layer, wherein:
    the stationary die comprises a main die and a slide die that moves relative to the main die, the slide die partially faces the cavity and moves in a direction different from a die clamping and die opening direction, and a face of the slide die that faces the cavity comprises faces extended in a plurality of directions that are not mutually in parallel,
    the main die comprises an accommodation space that accommodates the slide die partially or all of the slide die, the accommodation space is molded so as to allow the slide die to move in a predetermined direction, and the slide die is moved by an actuator so as to form a cavity for the foam layer in accordance with growth of the foam layer,
    a linear vector orthogonal to each of the faces extended in a plurality of directions making up the face of the slide die that faces the cavity is determined based on an area ratio of each face,
    a combined vector is determined by combining the respective linear vectors,
    a direction orthogonal to the combined vector is set as a movement direction of the slide die,
    one side face of the slide die is pushed out by an actuator,
    an inner wall of the movable die opposed to another side face of the slide die on the opposite side of the one side face is formed to be extended in a direction of the combined vector, and
    the slide die moves along the inner wall.

2. The molding die according to claim 1, wherein the face of the slide die that faces the cavity comprises a face orthogonal to the die clamping and die opening direction and another face.

3. The molding die according to claim 1, wherein a sensor is built in the movable die, the sensor being for confirming whether the slide die is in contact with the inner wall face of the movable die.

4. The molding die according to claim 3, further comprising alarm means that informs that a result of detection by the sensor is beyond a predetermined threshold value.

5. The molding die according to any one of claims 2 and 1 to 4, wherein the movable die comprises a main die and an insert that rotates inside the main die,
one face of the insert faces the cavity, and
the molding die further comprises adjustment means that adjusts an angle of the one face of the insert every time the core or the foam layer is molded.

6. The molding die according to any one of claims 1 to 4, wherein the movable die comprises a main die and an insert that moves inside the main die in a direction of the combined vector.

* * * * *